United States Patent [19]

Muelling et al.

[11] Patent Number: 4,645,320

[45] Date of Patent: Feb. 24, 1987

[54] CAMERA MOUNT FOR MOTOR VEHICLE

[75] Inventors: Duane D. Muelling, Milford; Ronald J. Willett, Pinckney; Philip E. Nimmo, Fenton, all of Mich.

[73] Assignee: General Motors Corporation, Detroit, Mich.

[21] Appl. No.: 811,452

[22] Filed: Dec. 20, 1985

[51] Int. Cl.⁴ ............................................. G03B 29/00
[52] U.S. Cl. .................................... 354/81; 352/132; 352/243
[58] Field of Search ..................... 354/81, 293, 74, 70; 352/132, 243; 358/229

[56] References Cited

U.S. PATENT DOCUMENTS

| | | | |
|---|---|---|---|
| 1,824,085 | 9/1931 | Karnes et al. | 354/70 |
| 2,506,095 | 5/1950 | Mantz | 354/74 |
| 3,094,054 | 6/1963 | Moors et al. | 354/74 |
| 3,176,308 | 3/1965 | Jensen | 354/70 |
| 3,380,310 | 4/1968 | Tommaso et al. | 354/70 |
| 3,515,472 | 6/1970 | Schwitzgebel | 352/132 |
| 3,523,660 | 8/1970 | Attebery et al. | 354/74 |
| 3,638,502 | 2/1972 | Leavitt et al. | 354/70 |
| 4,093,364 | 6/1978 | Miller | 352/132 |

Primary Examiner—A. A. Mathews
Attorney, Agent, or Firm—Robert M. Sigler

[57] ABSTRACT

A camera mount for a motor vehicle which always maintains the camera level with respect to the road surface regardless of vehicle rotations due to accelerational or gravitational forces to present a camera view typical of what a human would see looking out of the vehicle and responding to such vehicle rotations in the normal manner. The camera is supported on a pendulum suspended from a gimbal support on the vehicle sprung mass and constrained with spring and damping elements which are matched to the spring and damping elements of the vehicle suspension system to produce equal and opposite rotations of the pendulum for rotations of the vehicle.

3 Claims, 7 Drawing Figures

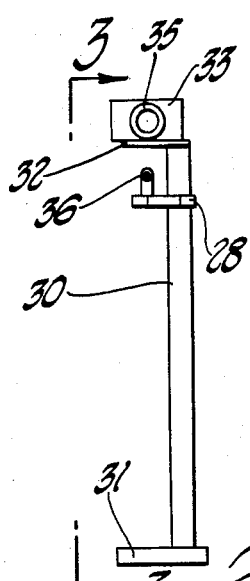
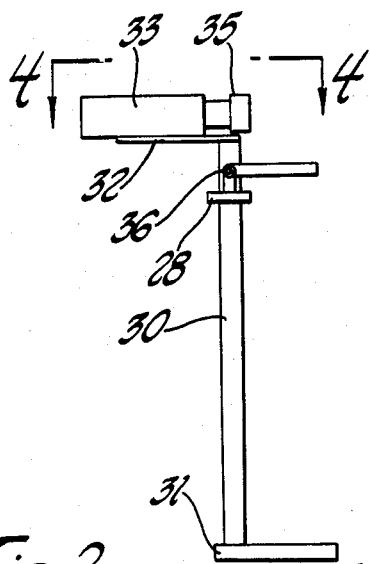
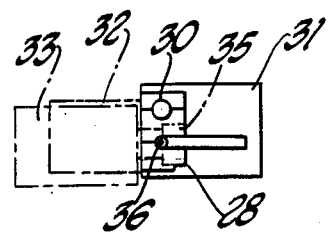
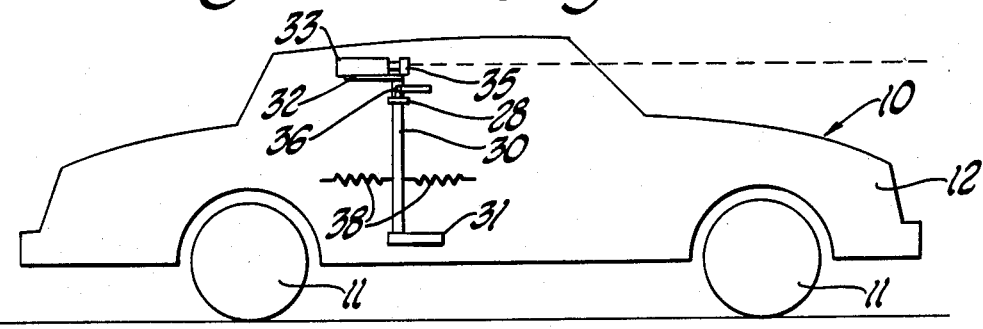
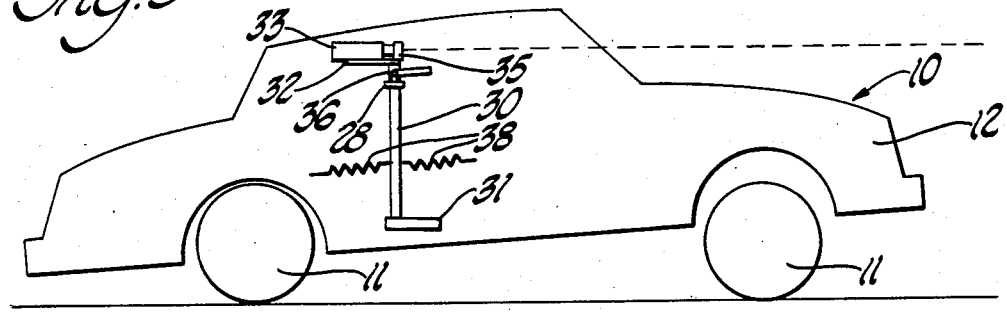
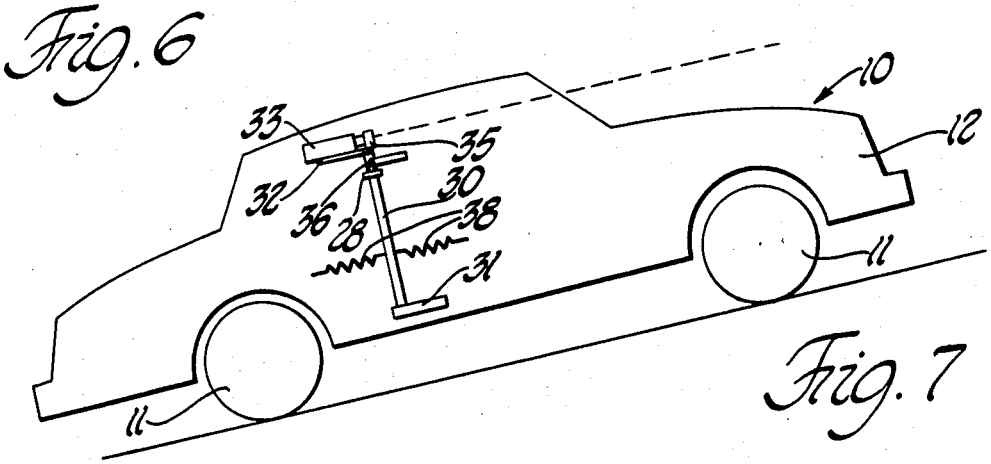

CAMERA MOUNT FOR MOTOR VEHICLE

BACKGROUND OF THE INVENTION

This invention relates to a mount for a camera in a vehicle which allows a moving picture to be taken through a window of the vehicle to show the exterior surroundings as they would be seen by a vehicle passenger. It has been observed that vehicle passengers tend to generally maintain their visual attitude oriented level to the apparent horizon. When a vehicle on level ground is subjected to horizontal accelerations such as cornering or braking, an occupant will lean his torso and/or head to maintain his level visual orientation. Moreover, when the vehicle is going uphill or downhill, the occupant tends to allow his body to rotate with the vehicle only sufficiently to maintain a visual orientation level relative to the horizon. A camera mount for a realistic moving picture of a vehicle occupant's view must operate in the same manner.

One prior art method of mounting a camera in a vehicle provides a platform fixed to the vehicle sprung mass. This mount, however, restrains the camera to rotate with the vehicle sprung mass at all times. Thus, through vehicle accelerations such as cornering and braking, the camera will tilt with respect to the road surface. On hills, the camera will over-rotate with the vehicle sprung mass due to gravitationally produced rotation and thus tilt forward or backward with respect to the road surface. In both cases the camera will produce a moving picture unrealistic in appearance, since it does not correspond to the behavior of most vehicle occupants during such maneuvers. Other prior art camera mounting methods attempt to solve this problem with a gyroscopic mount or an unrestrained pendulum mount, which have the potential, if properly designed, for maintaining the camera attitude level with respect to the horizontal during vehicle sprung mass rotations. However, they always maintain the camera angle horizontal, even as the vehicle goes up and down hill, which does not correspond to the behavior of most vehicle occupants.

SUMMARY OF THE INVENTION

The camera mount of the invention is adapted for a motor vehicle of the type having an unsprung mass with supporting wheels and a sprung mass, the unsprung mass being supported by the wheels on a road surface and the sprung mass being supported on the unsprung mass by a suspension system comprising vehicle spring elements and vehicle damping elements allowing relative rotation of the vehicle sprung mass relative to the unsprung mass due to accelerational and gravitational forces. The camera mount comprises a supporting frame rigidly supported within the motor vehicle sprung mass, a gimbal support on the supporting frame and a pendulum suspended from the gimbal support, the pendulum including camera support means and having a steady state position on a horizontal road surface in the absence of vehicle acceleration defining a level camera attitude with respect to the sprung mass and the unsprung mass.

Pendulum spring elements are effective to exert a restoring force when the pendulum rotates from its steady state position with respect to the vehicle sprung mass; and pendulum damping elements are effective to exert a damping force during pendulum rotation relative to the vehicle sprung mass. The pendulum spring elements and pendulum damping elements have spring and damping coefficients, respectively, of magnitude matched to those of the vehicle suspension system. Thus they are effective during rotations of the sprung mass relative to the unsprung mass due to accelerational or gravitational forces to allow rotation of the pendulum through an equal and opposite angle, whereby the camera is maintained level with respect to the road surface regardless of vehicle accelerations due to cornering, stopping and increasing velocity or grade changes in the road surface from the horizontal. Further details and advantages of this invention will be apparent from the accompanying drawings and following description of a preferred embodiment.

SUMMARY OF THE DRAWINGS

FIG. 2 is a front elevational view of the camera mount structure of the embodiment of FIG. 1 simplified to show the weight balancing thereof.

FIG. 3 is an elevational view taken along lines 3—3 of FIG. 2.

FIG. 4 is an elevational view taken along lines 4—4 of FIG. 3.

FIGS. 5-7 are side schematic views of a simplified version of the embodiment of FIG. 1 mounted in a vehicle which is, respectively, level and unaccelerated, level and accelerated, and unlevel and unaccelerated.

DESCRIPTION OF A PREFERRED EMBODIMENT

Figure 1:
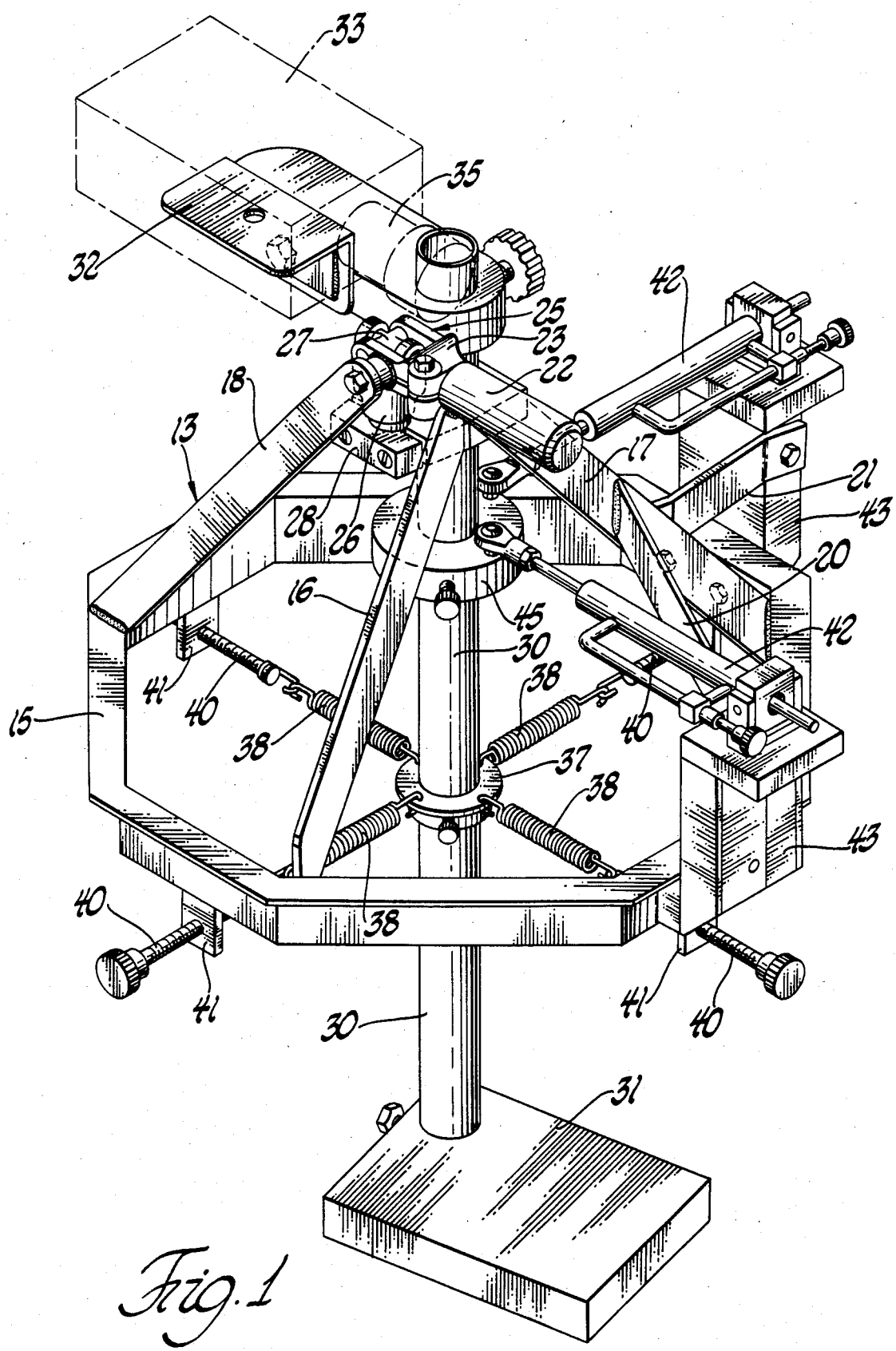
FIG. 1 is a perspective view of a preferred embodiment of a camera mount according to this invention.

Referring to FIG. 5, a motor vehicle 10 has an unsprung mass including wheels 11 and a sprung mass including a body 12. The sprung and unsprung masses are joined in a standard suspension system, not shown, including springs and damping elements at each of the wheels 11, which suspension system allows the sprung mass to rotate about horizontal axes with respect to the unsprung mass when subjected to strong horizontal accelerations. An exaggerated view of an accelerated vehicle is shown in FIG. 6, the particular acceleration being an increase in vehicle velocity with the body 12 rocking backward in rotation relative to wheels 11 and the road surface. The suspension system will, however, allow such rotation about any horizontal axis to allow components of sideways rocking as well as fore and aft rocking and combinations thereof.

FIG. 7 shows the same vehicle proceeding uphill with no acceleration. The springs of the suspension system allow some rotation of the sprung mass relative to the unsprung mass due to gravitational force; and the vehicle body 12 rocks back slightly with respect to the wheels 11 and road surface. If the vehicle were proceeding downhill, the vehicle body 12 would rock slightly forward with respect to the wheels 11 and road surface. Accelerations will produce rocking similar to that shown in FIG. 6 in the forward, backward or sideways direction relative to the position caused by the angle of the road surface. Such responses are familiar to anyone who has been in a motor vehicle operated on the public roads.

Referring to FIG. 1, a frame 13 comprises horizontal octagonal frame member 15, angular frame members 16, 17 and 18, and braces 20 and 21. Frame members 16 and 17 are fixed at their lower ends to frame member 15 and at their upper ends to mounting stud 22, by which the frame 13 is fixedly mounted within the passenger compartment of a motor vehicle. One U-shaped member 23 of a universal joint type gimbal mount 25 is clamped onto stud 22 and braced by the upper end of frame member 18. Another U-shaped member 26 of gimbal mount 25 is suspended from the X-shaped cross shaft 27 thereof so as to swing freely below it. A block 28 clamped onto the lower end of U-shaped member 26 extends sideways to support a vertical tube 30 having a pendulum weight 31 at its lower end and an adjustable camera mounting apparatus 32 at its upper end. A camera 33 is shown as a box with broken lines in mounted position on mounting plate 32. The camera lens 35 faces to the front right in the Figure, parallel to the stud 22.

Tube 30 is horizontally offset to one side along a first axis from the rotational center of the gimbal mount 25 and the camera is likewise horizontally offset to the back along a second axis from the rotational center of the gimbal mount 25. Therefore, the pendulum weight is horizontally offset by appropriate amounts in the opposite directions, to the other side along the first axis and to the front along the second axis. This places the components of the center of gravity of weight 31 along the first and second axes directly under the gimbal mount so that the tube naturally tends to hang truly vertically downward in the absence of horizontal accelerations. The relationships may be seen more clearly in the simplified structural views of FIGS. 2-4, wherein the pivot point of the gimbal apparatus is marked by the reference numeral 36.

Referring again to FIG. 1, a collar 37 on tube 30 between block 28 and pendulum weight 31 provides attachment for four coil springs 38 extending horizontally in tension in four directions—to the front, back, left and right—outwardly to adjustment screws 40 in mounting flanges 41 attached to frame member 15. These springs 38 provide a restoring force, adjustable by varying the length thereof with adjustment screws 40, which resists rotation of the pendulum comprising weight 31 and tube 30 in any direction away from a steady state position in which tube 30 is perpendicular to the plane of frame member 15. Damping members 42 connecting flanges 43 fixed to frame member 15 and collar 45 on tube 30 provide damping resistance to movement of the aforementioned pendulum. Flanges 43 are braced by braces 20 and 21. Damping members 42 are adjustable and extend orthogonally to each other, longitudinally and sideways relative to the vehicle body 12 and thus parallel to two of the springs 38. Springs 38 and damping members 42 are adjusted to provide spring and damping coefficients for the pendulum matched to the spring and damping coefficients of the vehicle suspension system under horizontal accelerations. In other words, if vehicle 10 is subjected to a horizontal acceleration which would cause body 12 of the sprung mass to rotate relative to the unsprung mass, the springs 38 and damping members 42 will allow an equal and opposite rotation of the pendulum weight 31 to maintain the preacceleration attitude of the camera. If the vehicle had been on a level horizontal surface before the acceleration so the camera was pointed at the horizon, the camera will remain pointed at the horizon through the acceleration. This is demonstrated in the sketches of FIGS. 5 and 6, wherein the vehicle first appears as in FIG. 5 before the acceleration, then appears as in FIG. 6 during the acceleration and finally appears as in FIG. 5 again when the acceleration is complete. A similar effect occurs for body 12 rotation forward in deceleration, to either side in cornering or in any combination of accelerative motions.

If the vehicle encounters a road surface which is not level, a gravitational component parallel to the plane of frame member 15 will produce some rotation of the sprung mass relative to the unsprung mass away from a position parallel to the road surface. However, once again, the pendulum camera mount will rotate an equal amount in the opposite direction so that the camera will tend to maintain an attitude parallel to the road surface. This situation is shown in the sketch of FIG. 7. Accelerations from the position shown in FIG. 7 will result in the camera maintaining the attitudinal position of FIG. 7 relative to the road surface as the vehicle body tilts. The camera mount thus behaves as would a vehicle passenger and produces a believable motion picture during vehicle maneuvers. The addition of accelerational rotation to gravitational rotation likewise does not affect the attitude of the camera, which remains constant regardless of the rotational forces on body 12.

The embodiments of the invention in which an exclusive property or privilege is claimed are defined as follows:

1. A camera mount for a motor vehicle of the type having an unsprung mass with supporting wheels and a sprung mass, the unsprung mass being supported by the wheels on a road surface and the sprung mass being supported on the unsprung mass by a suspension system comprising vehicle spring elements and vehicle damping elements allowing relative rotation of the vehicle sprung mass with respect to the unsprung mass due to accelerational and gravitational forces, the camera mount comprising, in combination:

a supporting frame rigidly supported within the motor vehicle sprung mass;

a gimbal support on the supporting frame;

a pendulum suspended from the gimbal support, the pendulum including camera support means and having a steady state position on a horizontal road surface in the absence of vehicle acceleration defining a level camera attitude with respect to the unsprung mass and the sprung mass;

pendulum spring elements effective to exert a restoring force when the pendulum rotates from its steady state position with respect to the vehicle sprung mass; and pendulum damping elements effective to exert a damping force during pendulum rotation relative to the vehicle sprung mass, the pendulum spring elements and pendulum damping elements having spring and damping coefficients, respectively, of magnitude matched to those of the vehicle suspension system and effective, during rotations of the sprung mass relative to the unsprung mass due to accelerational or gravitational forces, to allow rotation of the pendulum through an equal and opposite angle, whereby the camera is maintained level with respect to the road surface regardless of vehicle accelerations due to cornering, stopping and increasing velocity or grade changes in the road surface from the horizontal.

2. The camera mount of claim 1 in which the pendulum comprises a vertical member suspended from a point horizontally displaced from the gimbal support in a first direction along a first axis with a pendulum weight thereon below the gimbal support, the vertical member extending upward past the gimbal support with the camera mounting means effective to displace the camera mass horizontally from the vertical member in a second direction along a second axis orthogonal to the first, the pendulum weight extending horizontally from the vertical member along the first axis in a direction opposite the first direction and along the second axis in a direction opposite the second direction to place its center of gravity directly under the gimbal support when the pendulum is in its steady state position.

3. The camera mount of claim 1 in which the pendulum spring elements comprise four coil springs in tension with length adjusting members between the pendulum and an external frame member of the supporting frame, one spring extending in each of the front, back, left and right directions relative to the vehicle sprung mass and the pendulum damping elements comprise two adjustable dampers, extending between the pendulum and the external frame member parallel to two of the spring members and orthogonally with respect to each other.

* * * * *